Patented Oct. 30, 1923.

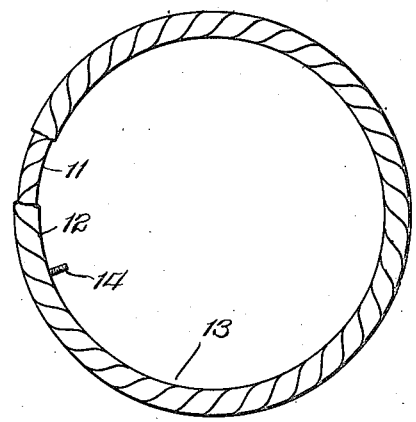
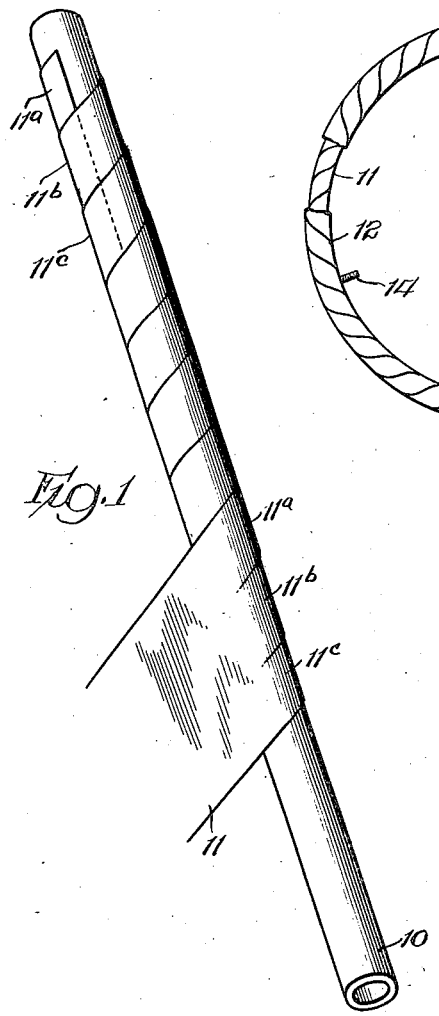
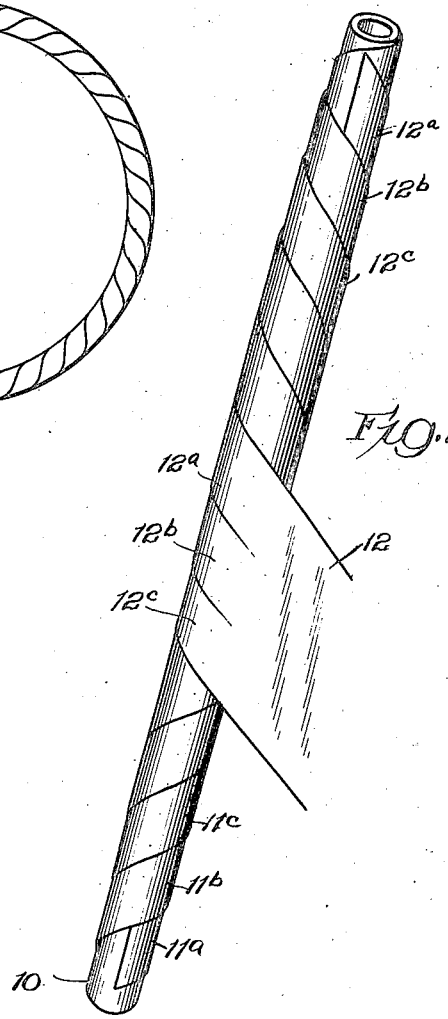

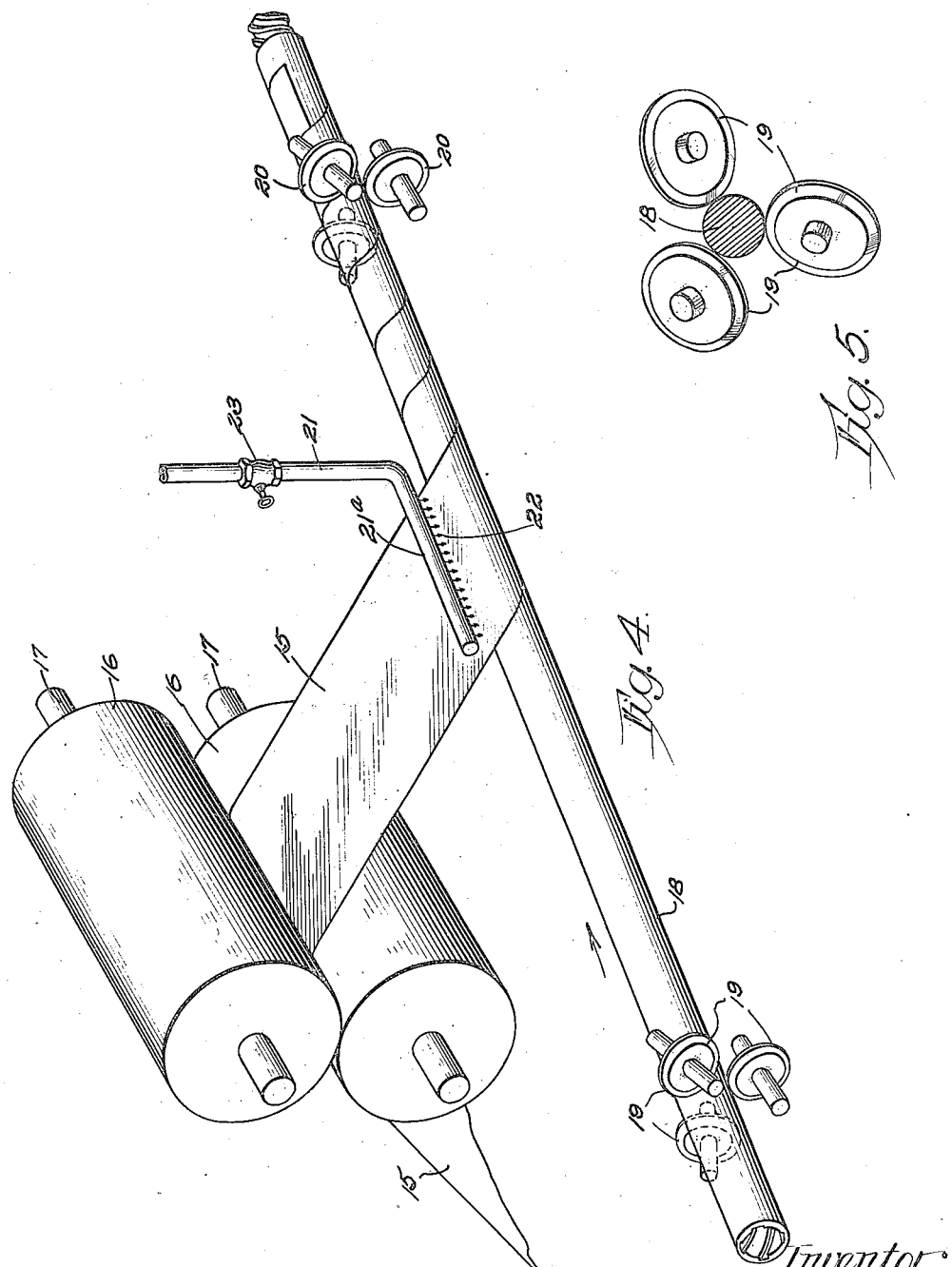

1,472,435

UNITED STATES PATENT OFFICE.

JOHN F. PALMER, OF ST. JOSEPH, MICHIGAN.

INNER TUBE FOR PNEUMATIC TIRES AND METHOD OF MAKING THE SAME.

Application filed March 27, 1920. Serial No. 369,251.

*To all whom it may concern:*

Be it known that I, JOHN F. PALMER, a citizen of the United States, residing at St. Joseph, in the county of Berrien and State of Michigan, have invented certain new and useful Improvements in Inner Tubes for Pneumatic Tires and Methods of Making the Same, of which the following is a specification.

My invention relates in general to fluid pressure-containing tubes, and more particularly to inner tubes of pneumatic tires, and method of making the same.

Pneumatic tires are subjected to excessive internal pressure, due not merely to the initial pressure of the air, but to the weight of the vehicles and the loads which they support, and also to the severe external compression to which they are subjected by encountering obstructions in usage. It is therefore of the greatest importance that inner tubes should be as nearly perfect as possible in their air-holding qualities. In order to attain this it is necessary that they should be uniformly capable throughout of withstanding a maximum interior pressure. It has been found impossible in practice to make inner tubes having this essential characteristic by merely using a single thickness of sheet rubber, owing to lack of uniformity in thickness and density throughout all portions of the sheet, due to imperfections in the product of the mixing mills and calender rolls used in making the sheets of rubber. It has therefore been the practice heretofore in manufacturing inner tubes to superpose a number of thin sheets of rubber, one upon the other, in order that any imperfections in one ply may be corrected, or sealed, by the other ply or plies. This is ordinarily accomplished by rolling a thin sheet of rubber upon a mandrel of the desired diameter, the mandrel being given such a number of complete revolutions as may be necessary to make a tube of the desired number of plies or laminations, producing in effect a multiplicity of concentric tubes. This process of manufacture is expensive in the appliances required, in labor cost, and in the losses due to imperfect products. Furthermore, tubes so made are defective, in that the sheets of rubber extend longitudinally of the tubes, whereas the greatest strength of the sheet lies in the direction of the fibrous arrangement which is lengthwise of the sheet, owing to the fact that it issues from the calender rolls in a direction longitudinally of the sheet. The greatest strength is, therefore, not in a direction radial of the tube, as it is not convenient in practising the present method of manufacture to have the length of the sheet of rubber extend transversely of the tube, hence the fibers are not most advantageously arranged for resisting the internal pressure.

A further objection to present manufacturing methods is that after such tube is made it is, according to present practice, brought into forcible contact with the surface of the mandrel upon which it is built by means of a spiral wrapping of muslin or the like, to the end that the air may be expelled from the region between the surface of the tube and the mandrel and in order to hold the rubber in forceful contact with the surface of the mandrel during vulcanization.

The principal object of the present invention is to overcome the necessity of wrapping the tube on the mandrel for the purpose of expelling the air by providing an improved method of manufacture whereby the application of the rubber itself to the mandrel effectively prevents the inclusion of any air between the mandrel and the rubber. Hence, there is no need for expelling the air, and when the tube is wound upon the mandrel the ends may be cut off and wrapped down with pieces of tape, as is customary, thereby preventing the entrance of air at either end of the tube. The tube may then be transferred at once to the vulcanizing chamber, where, under the pressure of the steam used for vulcanizing, the rubber assumes the contour of the surface of the mandrel against which it is pressed. After vulcanizing, the tube is removed and turned inside out as usual.

A further important object of the invention is to provide an improved fluid-pressure containing tube, such as an inner tube for pneumatic tires, which will be uniform throughout in its resistance to distention, and will possess the maximum strength with a minimum thickness. A further object of the invention is to provide an improved fluid pressure containing tube which will be simple in construction, economical in manufacture, efficient in operation, and durable in use. Still another important object of the invention is to provide an improved method of manufacturing fluid pressure containing tubes which will be simple and comparatively inexpensive in practice, and which will produce an improved product.

The nature of my invention will be more fully understood from a study of the following specification, taken in conjunction with the accompanying drawings, in which the tube is illustrated in a convenient and practical form, and in which the method of forming the tube is described.

In the drawings—

Figure 1 is a perspective view, showing the manner of winding a strip of sheet rubber upon a mandrel in making the improved tube of the present invention;

Fig. 2 is a view similar to Fig. 1, showing a second strip of sheet rubber being wound upon the convolutions which were formed by the winding of the first strip upon the mandrel;

Fig. 3 shows a detailed plan view of a tube embodying the invention, a portion thereof being broken away to show an inner layer of the rubber;

Fig. 4 shows a somewhat diagrammatic perspective view of the calender rolls and a mandrel illustrating one method of winding the sheet rubber on the mandrel and advancing the mandrel during the process of winding; and Fig. 5 shows a transverse sectional view, taken on the line 5—5 of Fig. 4.

Referring to Fig. 1 of the drawings, the reference numeral 10 designates a cylindrical mandrel, which may be of any desired length and which may be rotated in any desired manner. The reference numeral 11 designates a strip of rubber, formed by cutting a sheet of rubber longitudinally into the desired width as it issues from the usual calender rolls. One end of the strip of rubber 11 is placed upon the mandrel 10 upon one end thereof, and the strip is fed to the revolving mandrel at such an angle to the axis of the mandrel that the strip will be spirally wound upon the mandrel at the desired pitch. The pitch is determined according to the width of the strip and the number of the plies which it is desired to embody in the finished tube. A sufficient tension is placed upon the strip during the process of winding to cause it to lie tightly upon the mandrel and upon the underlying portions of the preceding convolutions; and this method of aplication is of particular advantage in preventing the inclusion of any air between the rubber and the surface of the mandrel.

As illustrated in Fig. 1, the width of the strip 11 and the angle at which it is fed to the mandrel have been so selected that the resulting tube will comprise three plies, because of the fact that the width of the strip is three times the pitch of winding. Assuming that the strip 11 comprises three longitudinal portions of equal width, $11^a$, $11^b$, and $11^c$, the section $11^a$ of each convolution will lie directly upon the central section $11^b$ of the preceding convolution, and will overlie the section $11^c$ of the second preceding convolution. Each convolution, therefore, forms a part of each of the three concentric plies which form the tube.

The inherent elasticity of the rubber compensates for the difference in diameter of the several sections of each convolution, such differences in diameter resulting from the fact that one section, $11^a$, of the strip overlies superposed sections of two preceding convolutions, while a second section, $11^b$, of each convolution overlies only one section of the immediately preceding convolution, and a third section, $11^c$, of each convolution rests directly upon the mandrel. The slight stretching of the rubber, which results from these differences in diameter of the sections of the strip when wound in convolutions upon the mandrel, results only in a negligible reduction of the thickness of the sheet, and does not result in producing a difference in the thickness of the resulting tube, inasmuch as every portion of the tube comprises similar superposed sections of three convolutions of the strip.

While a tube made of a single strip of sheet rubber, or other similar material formed by the winding of a single strip in the manner described, will possess sufficient strain-resisting capacity for many purposes, greater strength, and an even greater resistance to distention, may be secured by winding a second strip of similar material upon the tube previously formed by spirally winding a single strip in the manner above described. In Fig. 2 of the drawings there is illustrated a second strip of sheet rubber, or similar material, 12, which is wound spirally upon the tube formed on the mandrel by the winding thereon of the first strip 11. The second strip 12 is preferably fed to the revolving mandrel in such a direction that the convolutions are angularly disposed with relation to the convolutions of the first strip, and preferably inclined in the opposite direction longitudinally of the mandrel. In Fig. 2 the longitudinal portions of the strip 12, which overlaps the adjacent convolutions during the winding of the strip in order to effect the formation of three plies superposed upon the three plies formed by the strip 11, are designated by the numerals $12^a$, $12^b$, and $12^c$. The portion $12^a$ of the strip directly overlies the portion $12^b$ of the next preceding convolution of the strip 12, and the portion $12^b$ overlies the portion $12^c$ of the next preceding convolution, while the portion $12^c$ lies directly upon the exterior of the tube which has previously been formed by the spiral winding of the strip 11.

The tubes formed by this process may be of any length, but they are preferably made to conform to the ordinary practice in the manufacture of tubes for pneumatic tires. The mandrel should be made up in sections to correspond to the length of the tube necessary for a pneumatic tire, and these mandrel sections are keyed to one another and each adapted to be separated from the next adjacent one at pleasure. Before any joint in the mandrel is broken, or before the tube is severed to corresponding lengths, the rubber tube is taped down on either side of the mandrel joint to prevent the entrance of air at the open ends. After severing the tube and separating the mandrel section, the section of the mandrel and the tube are transferred at once to the vulcanizing chamber, where the pressure of the steam used in the vulcanizer imparts to the rubber the contour of the mandrel against which it is pressed. After vulcanizing the tube is removed, turned inside out, and, in case the tube is to be used as the inner tube of a pneumatic tire, the ends of the tube are brought together and united in any suitable manner to form a circular inner tube 13, as illustrated in Fig. 3, where the usual valve is designated by the numeral 14. The inner tube is thus formed without the usual labor and expense of externally winding the rubber with muslin, or the like, in order to expel the air, and at the same time a tube of increased strength and durability is obtained.

One means of applying the sheet rubber to the mandrel has been illustrated somewhat diagrammatically in Fig. 4, where a sheet of strip rubber 15 is passed between a pair of calender rolls 16, which are mounted on the shafts 17 and driven in any suitable manner. The sheet 15 is wound upon a mandrel 18, which is inclined at an angle to the axes of the rolls 16, so that as the strip of rubber emerges from the rolls and is wound upon the mandrel it follows the form of a spiral and produces overlapping convolutions, as previously described. The mandrel is preferably formed as one continuous member, and one method of advancing it to effect the winding of the rubber strip is to employ a number of driving wheels 19 having relatively narrow peripheral edges of rubber, or the like, which bear upon the mandrel 18 around its periphery. The axes of these rollers 19 are inclined to the longitudinal axis of the mandrel, so that as the rollers are driven by suitable driving mechanism their peripheral surfaces, engaging the surface of the mandrel at an angle, operate to feed the mandrel longitudinally, and at the same time they support it against lateral movement. The driving mechanism of the rollers 19 should be connected to the driving mechanism of the rolls 16, so that the two sets of rolls will operate in unison and in the proper time relation to effect a tight spiral winding of the rubber on the mandrel. The portion of the mandrel upon which the rubber has been wound may be supported by rollers 20, which extend on opposite sides thereof and permit the longitudinal advance of the mandrel, while preventing its lateral movement. The rollers 19 and 20 thus hold the mandrel, and resist the tension which is maintained in the strip of rubber 15 during the process of winding. This method of feeding the mandrel permits it to move continuously in the same direction, so that sections thereof can be cut off to form tubes of the desired length. As a means of supplementing the tension in the strip 15, for the purpose of maintaining the desired pressure between the strip and the mandrel and preventing the inclusion of air therebetween, there is provided an air pipe 21, having a portion $21^a$ thereof directed parallel to the mandrel above the strip of rubber 15 at the point where the strip is applied to the mandrel. This tube $21^a$ is provided on its underside with a plurality of apertures, which permits a series of air jets 22 to flow against the tube 15 and maintain the same in tight contact with the mandrel and with the preceding convolutions of the rubber. These air jets maintain the desired pressure, and also adjust themselves to the irregularity in the surface contour of the spiral tube, due to the overlapping convolutions previously described. The pressure of the air jet may be controlled by a valve 23.

It will be seen that by the above-described method of manufacturing, the longitudinal dimension of the strips extends around and not longitudinally of the resulting tube; consequently the fibers of the gum are laid spirally about the tube, thereby contributing superior strength against any distending force, such as the continued air pressure. It will be further observed that any imperfections in the strip of rubber, or any lack of uniformity in thickness or density, is compensated for by the overlapping of the succeeding convolutions of the strip as it is spirally wound upon the mandrel. It will be evident that the present invention provides an improved fluid pressure containing tube, especially adapted for use in pneumatic tires, which will possess a maximum capacity to resist distention with a minimum thickness, and in which the fibers are so disposed as to utilize the greatest resistance of the sheet rubber in the direction in which it is most needed, namely, in a direction radially of the section of the tube.

While I have shown and described certain forms of the improved tube, and have explained one method of carrying out the process, it will be understood that variations may be made without departing from the scope of the appended claims.

I claim:—

1. The process of manufacturing a fluid-pressure containing tube, which comprises the steps of applying the material of said tube to a supporting mandrel, excluding air from between said material and said mandrel during said application, and vulcanizing the tube on the mandrel without the application of external confining means.

2. The process of forming a fluid-pressure containing tube, which consists in spirally winding a strip of rubber or the like on a supporting mandrel, excluding air from between said mandrel and said strip during the operation of winding, confining the ends of the spirally wound tube to exclude the air, and immediately vulcanizing the tube on the mandrel.

3. The process of manufacturing a fluid-pressure containing tube, which consists in spirally winding a strip of rubber or the like to form overlapping convolutions, excluding air from the interior of the tube, and vulcanizing the tube without the application of external confining means.

4. The process of manufacturing a fluid pressure containing tube, which consists in progressively winding a strip of rubber or the like on a supporting member in spiral form, continuously applying pressure to said strip at the point of application to said member, preventing the entrance of air into the spirally wound tube at the ends thereof, and vulcanizing said tube on said member.

5. A fluid-pressure containing tube formed of a spirally wound strip of sheet rubber or the like, each succeeding convolution of which overlies portions of a predetermined number of preceding convolutions.

6. A fluid-pressure containing tube comprising superposed plies formed of overlapping convolutions of a spirally wound continuous strip of sheet rubber or the like.

7. A fluid-pressure containing tube formed of a continuous strip of sheet rubber or the like spirally wound to form overlapping convolutions.

8. A fluid-pressure containing tube comprising superposed layers all formed of cylindrically alining portions of the same spirally wound strip of material.

In testimony whereof, I have subscribed my name.

JOHN F. PALMER.